Sept. 25, 1951   E. STREIFTHAU   2,568,834
HUB
Filed Sept. 17, 1947
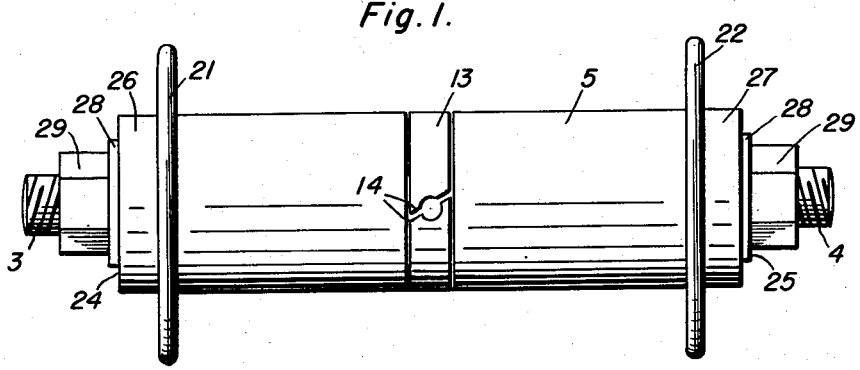
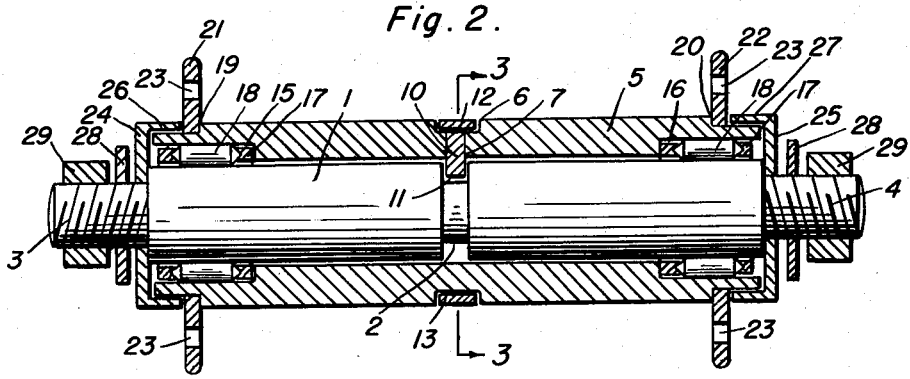
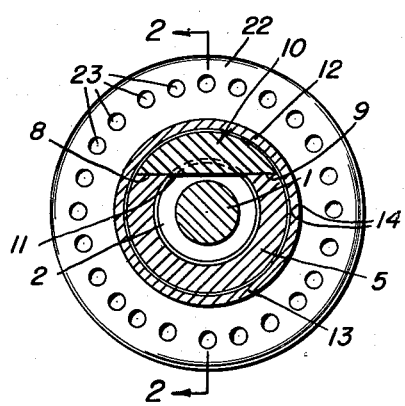
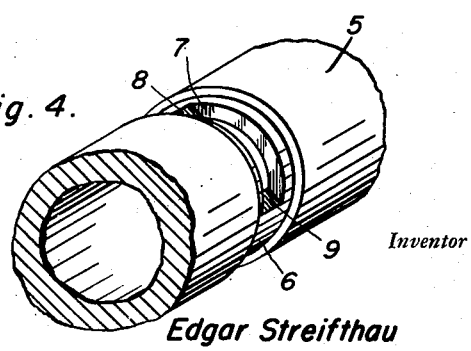
Inventor
Edgar Streifthau Patented Sept. 25, 1951

2,568,834

UNITED STATES PATENT OFFICE 2,568,834

HUB

Edgar Streifthau, Middletown, Ohio

Application September 17, 1947, Serial No. 774,525

3 Claims. (Cl. 301—1)

This invention relates to improvements in hubs for the front wheels of bicycles or motorcycles or the like.

An object of the invention is to provide an improved front hub construction for bicycles and motorcycles which will incorporate a plurality of roller bearings upon which the front hub will be rotatably mounted.

Another object of the invention is to provide an improved roller bearing hub for the front wheels of bicycles or motorcycles or the like, including an axle and centering means for centering and holding the hub upon said axle.

A further object of the invention is to provide an improved self-centering roller bearing hub for bicycles and motorcycles which will be highly efficient in use and relatively inexpensive to manufacture and produce.

Other objects will appear as the description proceeds.

In the accompanying drawings which form a part of this application,

Figure 1 is a side elevation of the improved roller bearing front wheel hub;

Figure 2 is a longitudinal sectional view through the improved roller bearing front wheel hub taken on the line 2—2 of Figure 3;

Figure 3 is a sectional view taken on the line 3—3 of Figure 2; and

Figure 4 is an enlarged perspective view of a portion of the hub shell showing the annular slot and key receiving slot formed therein.

Like characters of reference are used throughout the following specification and the accompanying drawings to designate corresponding parts.

In carrying out the invention, there is provided an improved roller bearing front wheel hub including a cylindrical axle generally designated by the reference numeral 1 being formed with a peripheral key receiving slot 2 disposed centrally of its length, and having its opposite ends reduced to provide the externally threaded terminal ends 3 and 4 for supporting the lower ends of a bicycle or motorcycle front fork (not shown).

A tubular hub shell 5 of a size to freely rotate upon the axle 1 and of the same length as the central portion of said axle is likewise formed with a centrally positioned peripheral groove 6 and a slot 7 extending completely through the shell forming spaced seats 8 and 9 upon which a key 10 will be supported. The key 10 is arcuate in shape and is formed with a flat side 11 for seating upon the seats 8 and 9, and the arcuate edge 12 will extend flush with the outer edges of the groove 6 in the hub shell 5 when the key 10 is in position within the slot 7.

A resilient split ring 13 is adapted to seat within the groove 6 after the key 10 is in place for holding the key in operative and in fixed position. The adjacent ends of said ring 13 are angled off as at 14 to permit a screw driver (not shown) or other tool or implement to be inserted between said ends, after which rotation of the tool or implement will cause the ring 13 to snap or spring out of said groove 6.

Inwardly extending annular recesses 15 and 16 will be formed in the inner wall of the hub shell 5 at its opposite ends and will house the races 17 and roller bearings 18 supported thereby, said roller bearings 18 having a bearing engagement upon the axle 1 and upon the outer walls of the annular recesses 15 and 16.

The opposite ends of the hub shell 5 will be formed with the annularly disposed reduced external shoulders 19 and 20 for receiving and supporting the washer-like spoke supporting flanges 21 and 22, respectively, which will be secured thereto by brazing or welding, or in any other desired manner. A plurality of circumferentially disposed openings 23 will be formed through the spoke-supporting flanges 21 and 22 for receiving the inner ends of the usual wheel spokes (not shown).

Centrally apertured dust caps 24 and 25 will be disposed over the reduced threaded ends 3 and 4 of the axle 1 and will include the inwardly directed flanges 26 and 27 for overlying the opposite ends of the hub shell 5 and roller bearings 18.

Washers 28 and internally threaded nuts 29 will be disposed upon the threaded ends 3 and 4 of the axle 1 for securing the improved hub in position between the lower ends of a bicycle or motorcycle front fork (not shown).

From the foregoing description, it will be apparent that the improved roller bearing front hub will be self centering upon its axle, and that the device will be highly efficient in operation and relatively inexpensive to manufacture and produce.

While the preferred embodiment of the instant invention has been illustrated and described, it will be understood that it is not intended to limit the scope of the invention thereto, as many minor changes in detail of construction may be resorted to without departure from the spirit of the invention.

Having thus described the invention, what is claimed as new is:

1. A roller bearing front wheel hub for bicycles and motorcycles comprising an axle having a centrally disposed peripheral groove and reduced externally threaded ends, a tubular hub rotatably mounted on said axle having a centrally disposed peripheral groove and a key receiving slot extending through a portion of said groove forming spaced supporting seats, a key having a flat edge and an arcuate edge disposed in said slot with said flat edge seated on said seats, a split retaining ring confined in said groove exteriorly of said key, said hub being formed with internally disposed annular recesses in its opposite ends, roller bearings and races supported in said annular recesses having bearing engagement with said axle and hub, said axle having bearing surfaces at the juncture of said axle with said threaded ends, and dust caps carried by said threaded ends and bearing against said bearing surfaces.

2. A roller bearing front wheel hub for bicycles and motorcycles comprising an axle having a centrally disposed peripheral groove and reduced externally threaded ends, a tubular hub rotatably mounted on said axle having a centrally disposed peripheral groove and a key receiving slot extending through a portion of said groove forming spaced supporting seats, a key having a flat edge and an arcuate edge disposed in said slot with said flat edge seated on said seats, a split retaining ring disposed in said groove exteriorly of said key, said hub being formed with internally disposed annular recesses in its opposite ends, roller bearings and races supported in said annular recesses having bearing engagement with said axle and hub, reduced peripheral seats on the opposite ends of said hub, apertured spoke supporting flanges secured to said last mentioned seats, and dust caps carried by the threaded ends and including annular flanges disposed adjacent the outer surfaces of said spoke supporting flanges to aid in retaining the latter positioned in said last mentioned seats.

3. A roller bearing front wheel hub for bicycles and motorcycles comprising an axle having a centrally disposed peripheral groove and reduced externally threaded ends, a tubular hub rotatably mounted on said axle having a centrally disposed peripheral groove and a key receiving slot extending through a portion of said groove forming spaced supporting seats, a key having a flat edge and an arcuate edge disposed in said slot with said flat edge seated on said seats, a split retaining ring disposed in said groove exteriorly of said key, said hub being formed with internally disposed annular recesses in its opposite ends, roller bearings and races supported in said annular recesses having bearing engagement with said axle and hub, reduced peripheral seats on the opposite ends of said hub, apertured spoke supporting flanges secured to said last mentioned seats, dust caps on the ends of said hubs and including flanges, and securing washers and internally threaded nuts on the reduced threaded terminal ends of said axle for urging the flanges of said dust caps toward the outer surfaces of said spoke supporting flanges to aid in retaining said spoke supporting flanges in said last mentioned seats.

EDGAR STREIFTHAU.

REFERENCES CITED

The following references are of record in the file of this patent:

UNITED STATES PATENTS

| Number | Name | Date |
| --- | --- | --- |
| 588,975 | Gary | Aug. 31, 1897 |
| 725,403 | Breitwiser | Apr. 14, 1903 |
| 956,041 | Cork | Apr. 20, 1910 |
| 1,257,893 | Lee | Feb. 26, 1918 |
| 1,643,460 | Jones | Sept. 27, 1927 |

FOREIGN PATENTS

| Number | Country | Date |
| --- | --- | --- |
| 15,514 | Great Britain | 1897 |
| 526,623 | France | 1921 |
| 552,391 | France | 1923 |
| 40,709 | Norway | 1925 |
| 638,120 | Germany | Nov. 11, 1936 |